United States Patent
Yoshida

(10) Patent No.: US 6,702,345 B1
(45) Date of Patent: Mar. 9, 2004

(54) VEHICULAR SHOCK ABSORBER

(75) Inventor: Hiroshi Yoshida, Soja (JP)

(73) Assignee: OM Corporation, Okayama (JP)

( * ) Notice: Subject to any disclaimer, the term of this patent is extended or adjusted under 35 U.S.C. 154(b) by 0 days.

(21) Appl. No.: 09/652,951

(22) Filed: Aug. 31, 2000

(30) Foreign Application Priority Data

Sep. 2, 1999 (JP) ............................................ P11-248558

(51) Int. Cl.$^7$ ................................................ B60R 19/34
(52) U.S. Cl. ...................................... 293/133; 188/377
(58) Field of Search ........................ 296/188; 293/133; 188/371, 377

(56) References Cited

U.S. PATENT DOCUMENTS

| | | | |
|---|---|---|---|
| 3,146,014 A | * | 8/1964 | Kroell |
| 3,511,345 A | * | 5/1970 | Takamatsu et al. |
| 3,599,757 A | * | 8/1971 | Takamatsu et al. |
| 4,537,734 A | | 8/1985 | Morganstern |
| 6,174,009 B1 | * | 1/2001 | McKeon ..................... 293/133 |
| 6,189,941 B1 | * | 2/2001 | Nohr .......................... 293/118 |
| 6,386,347 B1 | * | 5/2002 | Reynaert ..................... 188/377 |
| 6,554,333 B2 | * | 4/2003 | Shimotsu et al. ........... 293/132 |

FOREIGN PATENT DOCUMENTS

JP      H9-86309      3/1997

* cited by examiner

*Primary Examiner*—D. Glenn Dayoan
*Assistant Examiner*—Paul Chenevert
(74) *Attorney, Agent, or Firm*—Koda & Androlia

(57) ABSTRACT

A shock absorber for a vehicle making use of plastic deformation. The absorber is mounted between a bumper and the frame of the vehicle to transform impact energy applied to the bumper into deformation energy. The absorber comprises a straight tube that can be plastically deformed. A straight tube is partially enlarged or partially reduced to form different diameter tube portions. These tube portions are connected by step formed between the edge of each one. Thus, a multi-diameter stepped tube is formed. The tubes located at the both ends of this multi-diameter stepped tube are connected to the bumper and the frame of the vehicle respectively.

9 Claims, 5 Drawing Sheets

VEHICULAR SHOCK ABSORBER

BACKGROUND OF THE INVENTION

1. Field of the Invention

The present invention relates to a shock absorber mounted between a bumper and a frame of a vehicle to transform impact energy applied to the bumper into deformation energy to thereby absorb the energy.

2. Description of the Prior Art

Conventional shock absorbers include a cylinder type as described in U.S. Pat. No. 4,537,734 and a type using plastic deformation such as buckling. In the cylinder type, impact energy is absorbed as energy that compresses a cylinder. The latter type is described in Japanese Patent Laid-Open No. 086309/1997, and in which impact energy is transformed into deformation energy of a member, whereby the energy is absorbed. The cylinder type has the advantage that the energy absorbing characteristics are stable. However, this design needs precision and many components. Therefore, it has the disadvantage that the member is heavy and expensive. While, the type utilizing plastic deformation has the advantage that it is light and inexpensive, but this type is inferior to the cylinder type in energy absorbing property.

SUMMARY OF THE INVENTION

The shock absorber utilizing plastic deformation is lightweight and cheap, and so it meets the recent demand for reductions in vehicle fabrication costs. Accordingly, it is an object of the present invention to provide a shock absorber using plastic deformation, which is stable in energy absorbing property and is light in weight and is mechanically simple and inexpensive to manufacture. As a result, we have developed a shock absorber that is mounted between a bumper and a frame of a vehicle and acts to transform impact energy applied to the bumper into deformation energy, thereby absorbing the energy. This shock absorber is characterized in that it is a multi-diameter stepped tube consists of different diameter tube portions formed by partially reducing or partially enlarging a straight tube that can be plastically deformed. Each different diameter tube portions joined by steps formed between edge of each different diameter tube portions. One end of the multi-diameter stepped tube being connected to said bumper, and the other end of the multi-diameter stepped tube being connected to the frame of the vehicle, respectively. With this shock absorber, the bumper is normally held to the vehicle frame as a member that supports the bumper.

The shock absorber of the present invention is designed to absorb impact energy with the process that the small outside diameter tube portion is pushed into the large outside diameter tube portion. A part of the impact energy compresses the tube portions. However, the impact energy is mostly spent as plastic deformation of the step that is dragged in as the small outside diameter tube portion is pushed into the large outside diameter tube portion. In this way, the energy is absorbed.

The multi-diameter stepped tube is comprised as follows, namely, (a) the step formed between the edge of the tube portions are folded back to each tube portions, and (b) tube portions are joined by the step that the inside diameter of one tube portion is greater than the outside diameter of the other.

Concreteley, the shock absorber of the present invention comprises as follows,

In the (a), the step has already started to be plastically deformed. Therefore, the energy necessary for initial plastic deformation can be made small. Hence, the inward movement of the step that is dragged in progresses smoothly.

In the (b), the adjacent tubes easily telescope. Consequently, plastic deformation of the step progresses well. That the inside diameter of small outside diameter tube portion is greater than the outside diameter of the other one means that the width W of the step is greater than the wall thickness t of the larger outside diameter tube portion. Preferably, the sizes of the tube portions that are connected by the step roughly satisfy the following relations:

$t1 > t2$ and $W > t2$ where $t1$ is the wall thickness of the small outside diameter tube portion, $t2$ is the wall thickness of the large outside diameter tube portion, and W is the width of the step that connects both tube portions. It is assumed that the small and large outside diameter tube portions have lengths of H1 and H2, respectively.

Concretely, the shock absorber of the present invention comprises as follows, (1) the shock absorber, wherein the diameter stepped tube is a two-diameter stepped tube, the two-diameter stepped tube forming a large outside diameter tube portion and a small outside diameter tube portion which are substantially circle obtained by partially reducing or partially enlarging a straight tube that can be plastically deformed, each edge of different diameter tube portions joined by steps in order that an axis of each different diameter tubes located on a substantially aligned, and the large outside diameter tube portion provided and fixed on the impact receiving part of the frame of the vehicle, and (2) the shock absorber, wherein the multi-diameter stepped tube is a three-diameter stepped tube, the multi-diameter stepped tube forming a small outside diameter tube portion, a medium outside diameter tube portion and a large outside diameter tube portion which are substantially circle obtained by partially reducing or partially enlarging a straight tube that can be plastically deformed, each edge of different diameter tube portions connected by steps in order that an axis of each different diameter tube portions located on a substantially aligned, the different diameter tube portions arranged in order of size of diameter, and the large outside diameter tube portion provided and fixed on the impact receiving part of the frame of the vehicle.

Although the shock absorber in accordance with the present invention is preferably of multi-diameter stepped structure, substantial restrictions are placed on the number of stages due to the installation space. The three-diameter stepped tube is a realistic structure in terms of the number of machining steps. For example, a shock absorber consisting of a three-diameter stepped tube can be easily obtained as follows. On a normal round metal pipe (a circular straight tube), a given length from one end of the pipe is enlarged in diameter, and other end is reduced in diameter. In this three-diameter stepped tube, the medium outside diameter tube portion suppresses tilt of the small outside diameter tube portion. The small and medium diameter tube portions, respectively, can be together pushed into the large diameter tube portion.

It is assumed in the shock absorber comprising the three-diameter stepped tube that the small outside diameter tube portion has a length of H1 and a wall thickness of $t1$, the medium outside diameter tube portion has a length of H2 and a wall thickness of $t2$, the large outside diameter tube portion has a length of H3 and a wall thickness of $t3$, the step connecting the small and medium outside diameter tube portions has a width of W1, and the step connecting the medium and large outside diameter tube portions has a width of W2. Relations t1>t2>t3, W1>t2, and W2>t3 hold. As mentioned previously, where a normal round metal pipe is partially enlarged and reduced in diameter to form a three-diameter stepped tube, the wall thickness t1 of the small outside diameter tube portion obtained by reducing the diameter is inevitably large than the wall thickness t2 of the medium outside diameter tube portion. Also, the wall thickness t3 of the large outside diameter tube portion obtained by enlarging the diameter is unavoidably small than the wall thickness t2 of the medium outside diameter tube portion. One metal pipe is subjected to two plastic processing steps, i.e., increase of the diameter and decrease of the diameter. As a result, a shock absorber consisting of a desirable three-diameter stepped tube can be fabricated.

DETAILED DESCRIPTION OF THE INVENTION

Figure 1:
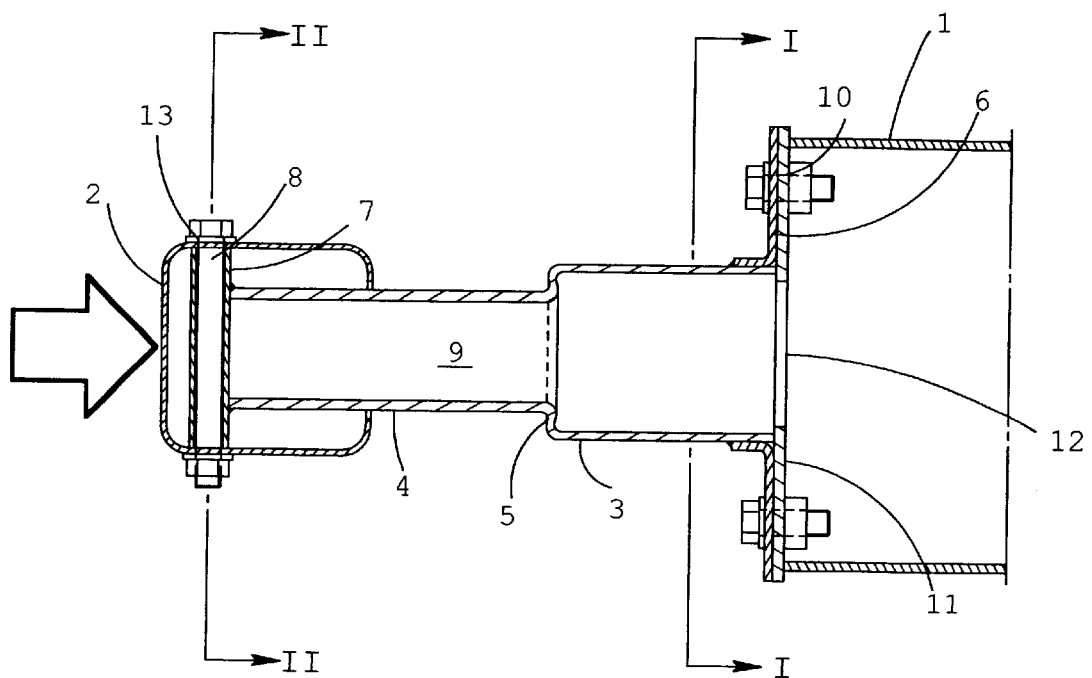
FIG. 1 is a vertical cross section view of a shock absorber consisting of a two-diameter stepped tube in accordance with the present invention.
Figure 2:
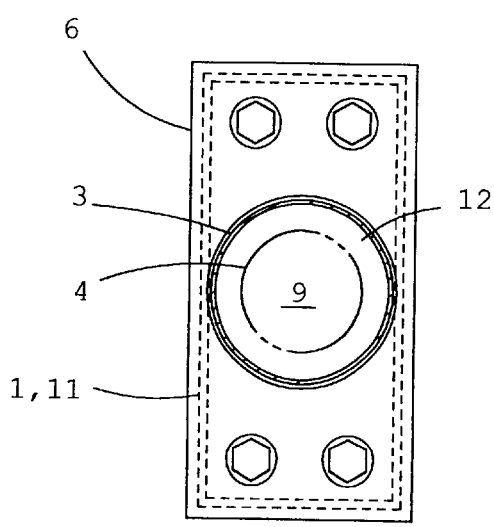
FIG. 2 is a cross-sectional view taken along the line I—I of FIG. 1.

As shown in FIG. 1, a shock absorber of the present invention comprises a two-diameter stepped tube 9 mounted between a bumper 2 and a frame 1 of a vehicle. This two-diameter stepped tube 9 transforms impact energy into deformation energy, thereby absorbing the energy. The two-diameter stepped tube 9 consists of a large outside diameter tube portion 3 and a small outside diameter tube portion 4. Both tube portions 3 and 4 are substantially circular in cross section. The edge of both tube portions 3 and 4 are joined by a step 5 such that the axes of the tube portions 3 and 4 are substantially aligned. The large outside diameter tube portion 3 is attached to a side of the vehicle frame 1 that receives shock. At the step 5, the edge of both tube portions 3 and 4 overlap each other in the longitudinal direction of the two-diameter stepped tube and are bent back to the tube portions 3 and 4.

This two-diameter stepped tube 9 is fabricated as follows. A straight tube is prepared as the large outside diameter tube portion 3. A part of this straight tube is swaged to reduce the cross-sectional area, thus forming the small outside diameter tube portion 4. The step 5 folded back can be easily formed if pressed longitudinally of the two-diameter stepped tube 9.

Figure 3:
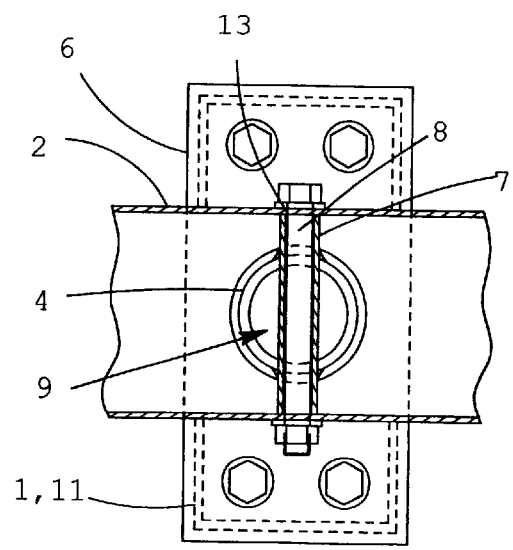
FIG. 3 is a cross-sectional view taken along the line II—II of FIG. 1.

To cause this two-diameter stepped tube provide and fix to the receiving impact part of the frame 1, a mounting flange 6 having plural bolt holes 10 is welded to the large outside diameter tube portion 3. The diameter of tube passage holes 12 formed in a tube-mounting seat 11 of the vehicle frame 1 is set small than the outside diameter of the large outside diameter tube portion 3. Although the large outside diameter tube portion 3 that is pushed in is checked, the small outside diameter tube portion 4 can be pushed in together with the step 5 dragged in. The two-diameter stepped tube 9 and the bumper 2 are mounted together by welding a mounting pipe 7 that is vertical to the end of the small outside diameter tube portion 4, inserting bolts 8 into bolt holes 13 in the pipe 7 and in the bumper 2, and fastening the bolts, as shown in FIGS. 1 and 3.

Figure 4:
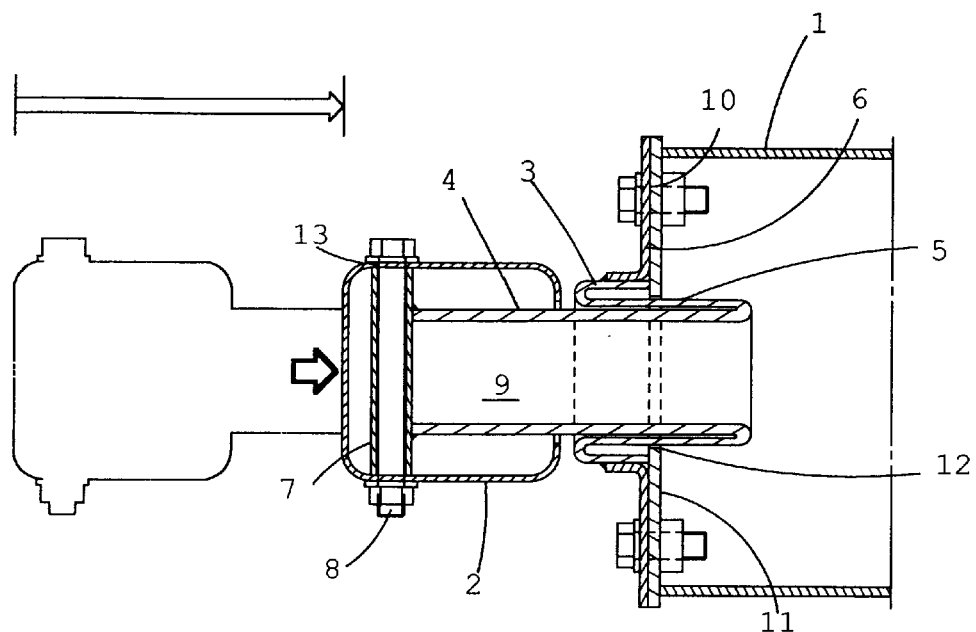
FIG. 4 is a vertical cross-section view showing the relation between the degree of shock absorption and the degree of deformation of a two-diameter stepped tube when the shock is applied to the shock absorber which chenged from the state of FIG. 1.

In the shock absorber of the present embodiment, if impact is applied to the bumper 2, the step 5 is dragged in toward the large outside diameter tube portion 3, as shown in FIG. 4. In FIGS. 1 and 4, the magnitude of impact energy is indicated by the bold outline arrow within the two-diameter stepped tube 9. Deformation energy is indicated by the amount of plastic deformation and denoted by the thin outline arrow outside the two-diameter stepped tube 9. Before the state shown in FIG. 4 is reached, the impact energy has been almost fully absorbed in practice. For convenience of explanation, the bold outline arrow is left.

If the large outside diameter tube portion 3 is left as a straight tube, and if a round metal pipe is reduced in diameter to form the small outside diameter tube portion 4, this tube portion 4 has a large wall thickness with desirable results. In this case, the large outside diameter tube portion 3 and the small outside diameter tube portion 4 are substantially circular in cross section. Their axes are substantially aligned. Therefore, the energy absorption efficiency is high. Stable energy absorption characteristics are imparted to the shock absorber. The relation of load causing the step to be, dragged in to the amount of movement of the bumper shows rectangular-wave characteristics. The tube portion 4 of the small outside diameter may be solid.

Figure 5:
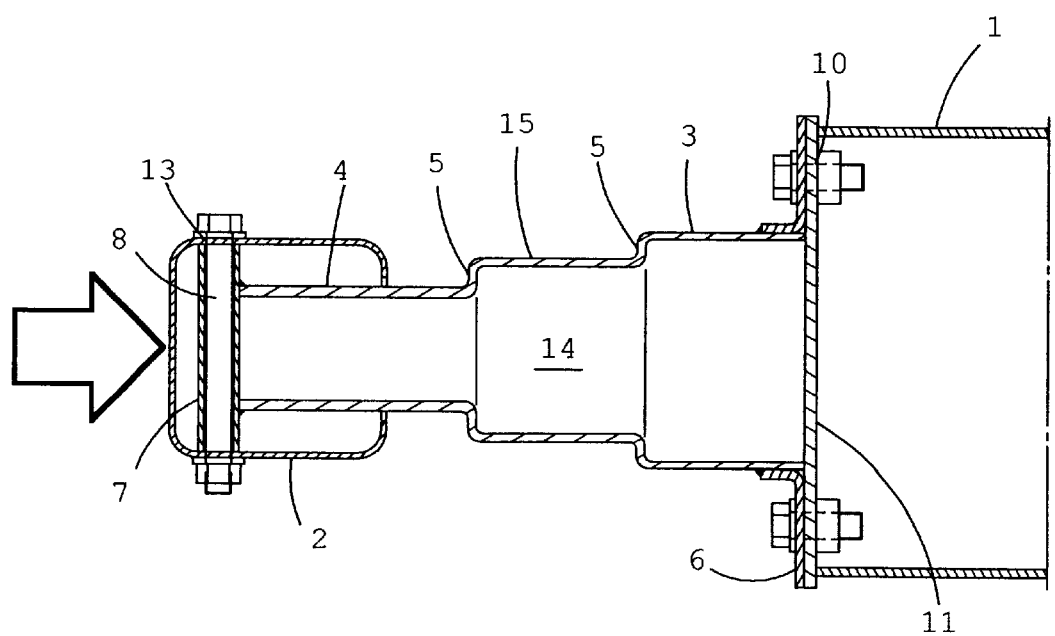
FIG. 5 is a vertical cross-section view of a shock absorber consisting of a three-diameter stepped tube in accordance with the present invention.

Another shock absorber in accordance with the present invention is shown in FIG. 5 and comprises a round metal pipe of substantially circular cross section. A length of H1 of this pipe from one end is reduced in diameter to form a small outside diameter tube portion 4. A length of H3 from the other end is enlarged in diameter to form a large outside diameter tube portion 3. The remaining length H2 of the round metal pipe is left as it is to form a medium outside diameter tube portion 15. The adjacent tubes are connected via steps 5, respectively. The axes of the tube portions 3, 4, and 15 are substantially aligned such that plastic deformations at the steps 5 are equal in the circumferential direction. In the present embodiment, the steps 5 are in a plane perpendicular to the longitudinal direction of the three-diameter stepped tube. Description of the method of mounting this shock absorber to a vehicle is omitted herein. In the present embodiment, the vehicle frame 1 is not provided with holes for passing the tube portions to prevent the small and medium outside diameter tube portions 4 and 15, respectively, from being pushed in. However, for example, it may be provided with a hole permitting passage of only the small outside diameter tube portion 14.

Figure 6:
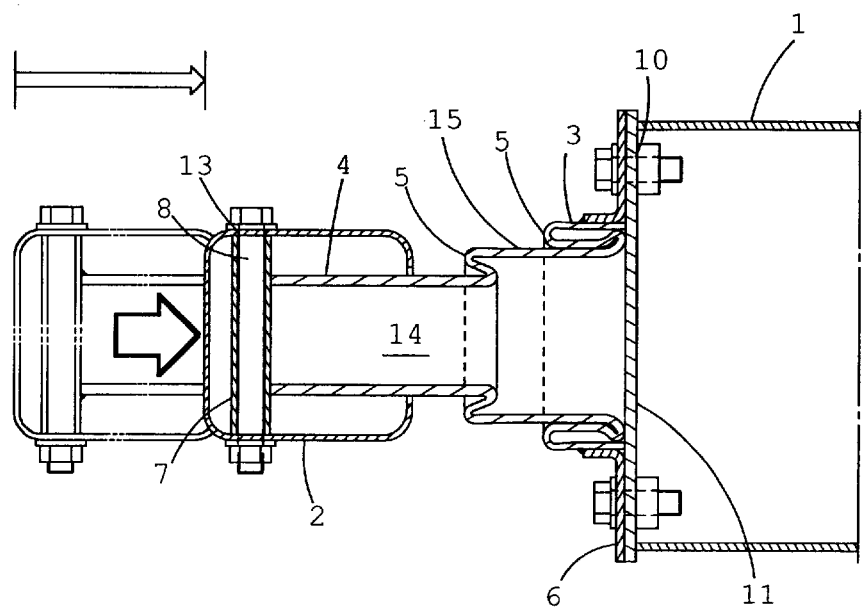
FIG. 6 is a vertical cross-section view showing a medium outside diameter tube portion has been pushed into the large outside diameter tube portion which chenged from the state of FIG. 5.
Figure 7:
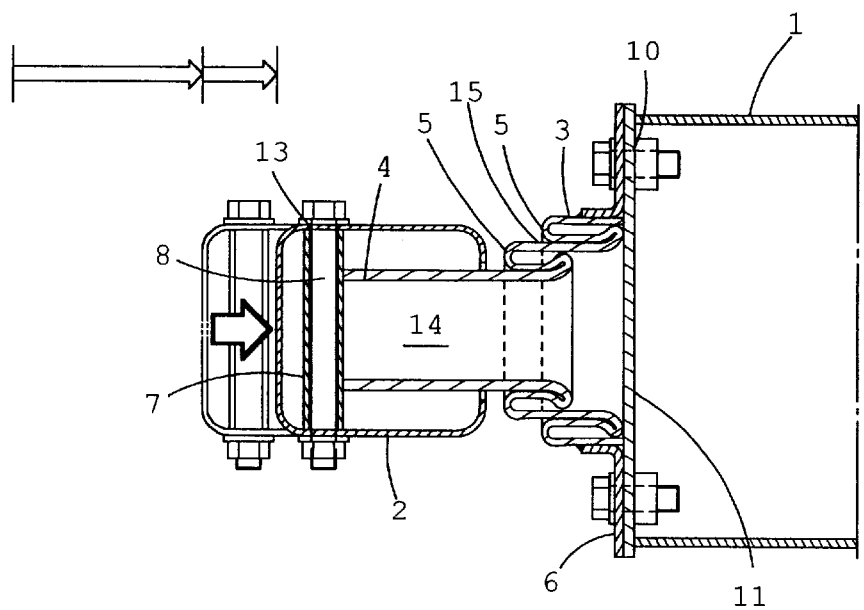
FIG. 7 is a vertical cross-section view which small outside diameter tube portion has started to be pushed into the medium outside diameter tube portion which chenged from the state of FIG. 6.
Figure 8:
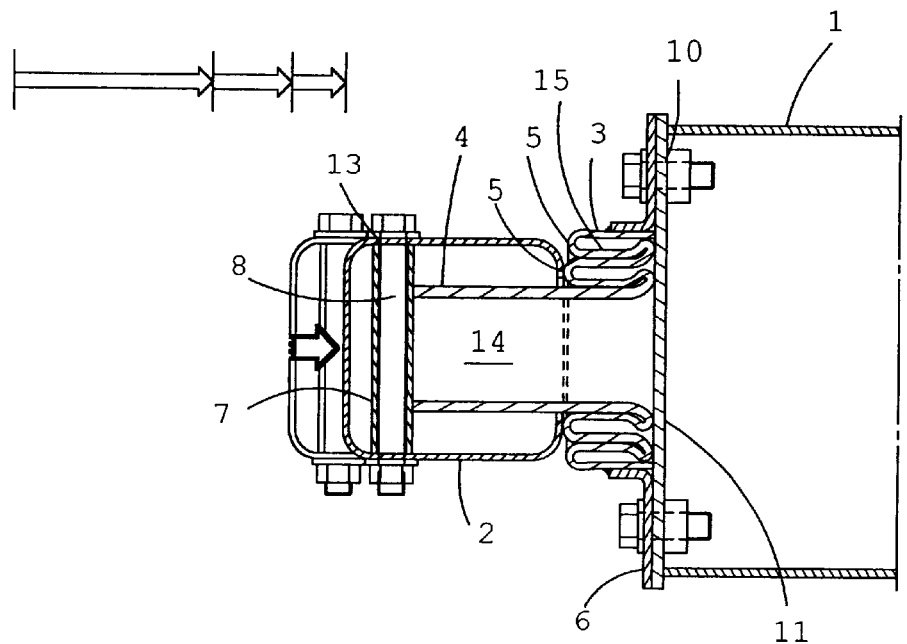
FIG. 8 is a vertical cross section view showing the impact energy has been mostly absorbed.

Under the condition shown in FIG. 5, if impact is applied to the bumper 2, the impact is transmitted to the medium and large outside diameter tube portions 3 and 15 via the steps 5, as well as to the small outside diameter tube portion 4. The small outside diameter tube portion 4 starts to be deformed in such a way that it is pressed into the medium outside diameter tube portion 15 and that this medium diameter tube portion 15 is pressed into the large outside diameter tube portion 3. In FIGS. 5–8, the magnitude of impact energy is indicated by a solid outline arrow within the three-diameter stepped tube 14. Deformation energy is indicated by the amount of plastic deformation (the amount of inward movement) and denoted by the thin outline arrow outside the three-diameter stepped tube 14. In practice, impact energy has been almost fully absorbed before the state shown in FIG. 8 is reached. However, for convenience of explanation, the solid outline arrow is left. The steps 5 are plastically deformed and dragged in. This is realized by the fact that the pushed tube portion (e.g., the large outside diameter tube portion 3) is dragged in together with the steps 5 rather than the pushing tube itself (e.g., the medium outside diameter tube portion 15). In the present three-diameter stepped tube, the thickness t1 of the small outside diameter tube portion 4 is larger as compared with the thickness t2 of the medium diameter tube portion 15 of the straight tube. Conversely, the wall thickness t3 of the enlarged tube 3 of the greater outside diameter is smallest. The width W1 of the step 5 between the small outside diameter tube portion 4 and the medium diameter tube portion 15 is greater than the thickness t2. The width W2 of the step 5 between the large outside diameter tube portion 3 and the medium outside diameter tube portion 15 is greater than the thickness t3. Therefore, plastic deformation of the step 5 occurring when it is dragged in starts as the medium diameter tube portion 15 is pushed into the large outside diameter tube portion 3 as shown in FIG. 6.

In this way, the impact energy is first absorbed as inward movement of both of the small and medium diameter tube portions 4 and 15, respectively. That is, the impact energy is absorbed as energy that deforms, or drags in, the step 5 located between the medium and greater diameter tube portions 3 and 15, respectively. Similarly, the impact energy is exploited as deformation energy that pushes the small outside diameter tube portion 4 into the medium diameter tube portion 15. Consequently, as shown in FIG. 6, the step 5 between the small outside diameter tube portion 4 and the medium diameter tube portion 15 is slightly dragged in.

In the present embodiment, the presence of the vehicle frame 1 limits the inward movement of the step 5 being dragged in, the step 5 being located between the medium diameter tube portion 3 and the large outside diameter tube portion 15, as shown in FIG. 6. Then, as shown in FIG. 7, impact energy is started to be absorbed as energy that deforms, or drags in, the step 5 positioned between the small outside diameter tube portion, 4 and the medium diameter tube portion 15. If the impact energy still remains, the inward movement of the step 5 located between the small outside diameter tube portion 4 and the medium diameter tube portion 15 progresses until the movement is limited by the vehicle frame 1, as shown in FIG. 8. Both steps 5 are dragged in as described above. That is, the impact energy is transformed into deformation energy. In this way, the impact energy is mostly absorbed. The impact energy transmitted to the vehicle frame 1 can be almost fully removed.

Figure 9:
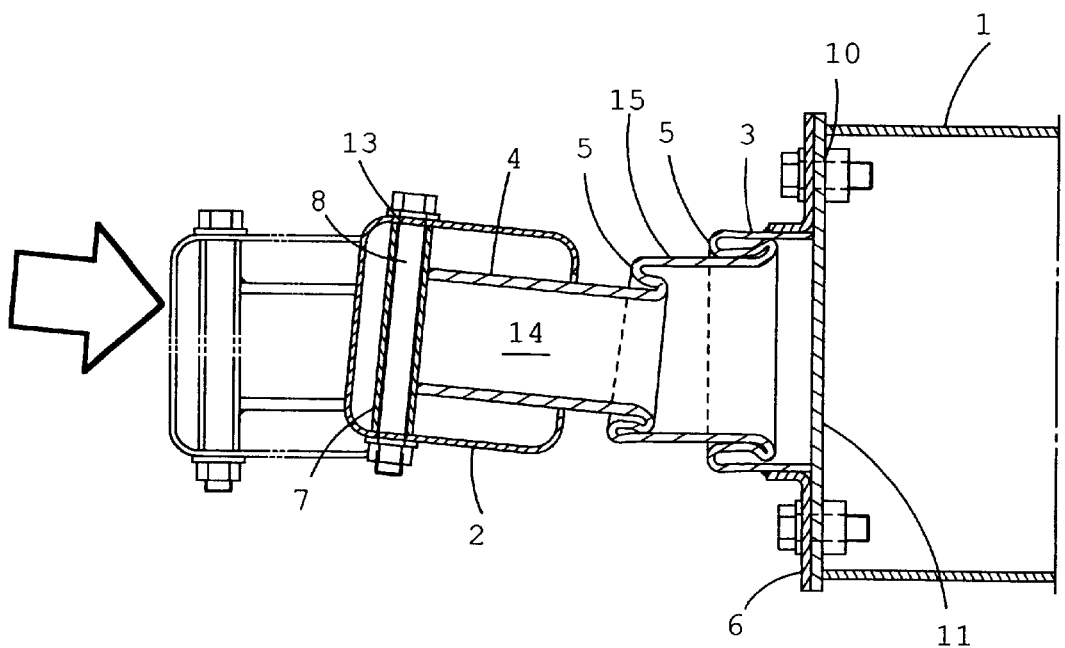
FIG. 9 is a vertical cross-section view showing shock is applied from a diagonal direction to the shock absorber which chenged from the state of FIG. 5.

More preferably, the shock absorber in accordance with the present invention comprises a three-diameter stepped tube 14 having three or more steps having different outside diameter tube portions. This is demonstrated clearly especially where impact is applied at an angle to the bumper 2. FIG. 9 is a vertical cross-section view showing shock is applied at an angle to the shock absorber under the state of FIG. 5 and the degree of deformation of the three-diameter stepped tube 14. As mentioned above, the wall thicknesses of the three tube portions 3, 4, and 15 of different outside diameters have the relations given by $$t1 > t2 > t3$$

With respect to the steps 5, the relations $$W1 > t2 \text{ and } W2 > t3$$

hold. In addition, the relation between the lengths of the tube portions is associated with the degrees of ease with which they are tilted. In the present embodiment, the length H1 of the small outside diameter tube portion 4 is greater than the length H2 of the medium diameter tube portion 15. The length H2 of the medium diameter tube portion 15 is nearly equal to the length H3 of the large outside diameter tube portion 3. Therefore, if impact is obliquely applied to the bumper 2, the small outside diameter tube portion 4 tilts while dragging in the step 5 slightly, as shown in FIG. 9. The medium diameter tube portion 15 supports the large outside diameter tube portion 4 and is plastically deformed so as to be pushed into the large outside diameter tube portion 3. In this way, the impact energy can be absorbed.

In this manner, in the shock absorber comprising the three-diameter stepped tube, the successive tube portions restrict their mutual tilting movements. Finally, the directions of plastic deformations are made identical, i.e., the medium diameter tube portion 15 is pressed into the large outside diameter tube portion 3. Hence, impact energy can be absorbed uniformly irrespective of the direction of applied impact. The amount of absorbable impact is in proportion to the total of the inward movements of the steps that are dragged in. The amount of inward movement of each step being dragged in is governed by the length of the shorter one of the pushing and pushed tube portions. Therefore, the tube portions are preferably equal in length. In the above embodiment, H2=H3. Also, with respect to the length H1 of the small outside diameter tube portion, this length is equal to the length of the other tube portions, if a margin for mounting to the bumper is neglected. Hence, roughly H1=H2=H3.

Figure 10:
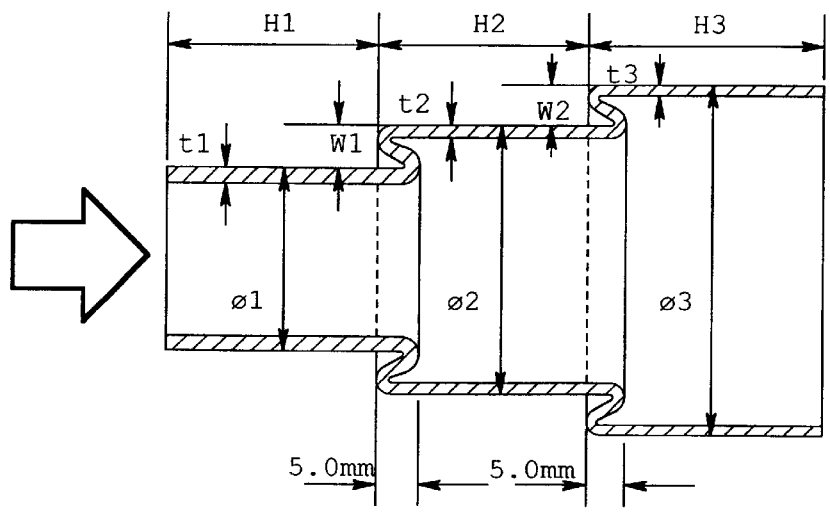
FIG. 10 is a vertical cross-section view of a shock absorber used in a sample shock absorber.

Energy absorption of plural shock absorbers each consisting of a three-diameter stepped tube was measured. The shock absorbers included a sample shock absorber whose contour is shown in FIG. 10. This absorber has a circular straight tube of steel having a diameter of 50.8 mm. The small outside diameter tube portion has an outside diameter Phi1 of 34.8 mm, a length H1 of 45.0 mm, and a wall thickness t1 of 2.95 mm. The medium outside diameter tube portion has an outside diameter Phi2 of 50.8 mm, a length H2 of 50.0 mm, and a wall thickness t2 of 2.30 mm. The large outside diameter tube portion has an outside diameter Phi3 of 66.0 mm, a length H3 of 50.0 mm, and a wall thickness of t3 of 2.00 mm. In this way, a three-diameter stepped tube is formed. As can be seen from the description provided above, it follows that W1=8.0 mm and W2=7.6 mm. A length of 5.0 mm of each step is folded back to the corresponding tube.

Figure 11:
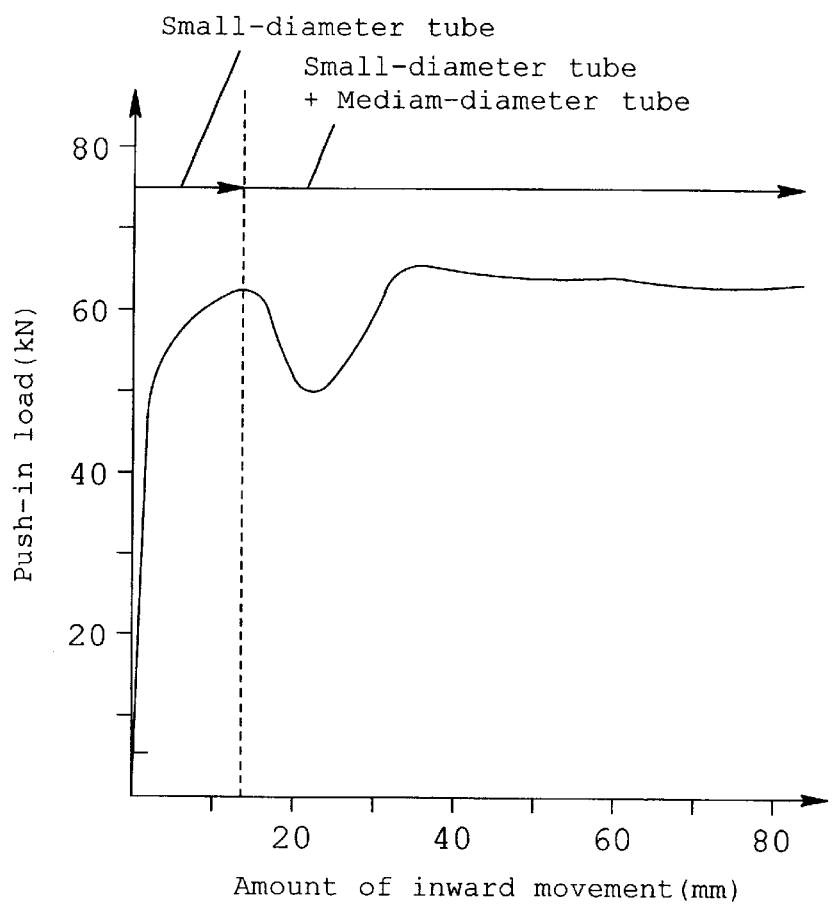
FIG. 11 is a graph showing the results of a measurement of energy absorption of the sample shock absorber.

The measurements were conducted in the manner described now. A load was applied to the small outside diameter tube. Each tube was pushed in. The relation of the amount of absorbed energy to the amount of inward movement (i.e., amount of deformation of the bumper, in mm) was measured as push-in load (kN). The results of the measurements are indicated in the graph of FIG. 11. In the sample shock absorber, the steps were formed by separate processing steps. A large push-in load was necessary until the steps were first structurally deformed, i.e., when the push-in load reached 13 mm. In the shock absorber in accordance with the present invention, the plastic deformation of each step once dropped past the aforementioned push-in load, and then the plastic deformation was observed where the push-in load was 13 mm or more. Its energy absorption characteristic curve resembles a rectangular wave. Consequently, it can be confirmed that if the steps are previously so processed that they can be plastically deformed, the shock absorber in accordance with the present invention has energy absorption characteristic curve resembling a rectangular wave.

The vehicular shock absorber in accordance with the present invention yields the following advantages.

(1) The energy absorption characteristic curve assumes the form of a rectangular wave. That is, the amount of absorbed energy increases rapidly. Immediately thereafter, the rate at which energy is absorbed is kept constant. Consequently, the energy absorption efficiency is high.

(2) The multi-diameter stepped tube has tubes arranged in order of outside diameter. This tube easily provides rigidity that supports a bumper. A cross section corresponding to the distribution of bending moments is obtained.

(3) Since the steps that are plastically deformed are present on the outer peripheries at the edge of the tube portions, stable plastic deformation can be readily obtained.

(4) Because the load transmitted to a bracket or the like to which this shock absorber is mounted is compressive in nature, the strength is stable.

(5) A metal pipe can be easily formed into desired forms by increasing or reducing the diameter by means of swaging, pressing, or other method. Final products of stable shapes can be easily fabricated.

(6) The reduced tube has a large wall thickness. The enlarged tube has a reduced wall thickness. The relation between the sizes of these tubes is suitable for efficient production of plastic deformation.

(7) The prior art double-tube shock absorber has needed a high positional accuracy between pipes, lubrication, dustproofness, and a structure for securing rigid support. Unlike such prior art structure, the shock absorber in accordance with the invention needs none of these requirements. Hence, the shock absorber in accordance with the invention is superior in light weightness, cost, and reliability to the prior art construction.

(8) The amount of plastic deformation can be increased by increasing the number of steps in the multi-diameter stepped tube. Hence, the amount of absorbed energy can be easily increased.

I claim:

1. A shock absorber for a vehicle mounted between the bumper and the frame to transform impact energy applied to the bumper into deformation energy to thereby absorb the energy, wherein:

said shock absorber is a multi-diameter stepped tube;

said multi-diameter stepped tube consists of different diameter integral tube portions formed by partially reducing or partially enlarging a straight tube that can be plastically deformed, said each different diameter tube portions are integrally joined by steps formed between adjacent edges of each different diameter tube portions, one end of said multi-diameter stepped tube being connected to said bumper, the other end of said multi-diameter stepped tube being connected to the frame of the vehicle;

each of the steps formed between the adjacent edges of the different diameter tube portions comprises an overlapped and folded back portion whereby a majority of the impact energy applied to the bumper is spent as plastic deformation of larger diameter tube portions; and a tube passage hole is provided in said fame coaxial with said multi-diameter stepped tube for passing said multi-diameter stepped tube sequentially from said larger diameter tube portion while absorbing impact energy.

2. The shock absorber according to claim 1 wherein a wall thickness of each succeeding smaller diameter tube portion is larger than a wall thickness of the proceeding larger in diameter tube portion.

3. A shock absorber according to claim 1, wherein said multi-diameter stepped tube is a two-diameter stepped tube, said two diameter stepped tube forming a large outside diameter tube portion and a small outside diameter tube portion which are substantially circle obtained by partially reducing or partially enlarging a straight tube that can be plastically deformed, each edge of different diameter tube portions joined by steps in order that axes of each different diameter tubes located on a substantially aligned axis, and said large outside diameter tube portion provided and fixed on the impact receiving part of the frame of the vehicle.

4. The shock absorber for a vehicle according to claim 3 wherein a width of a step between said small outside diameter tube portion and said large outside diameter tube portion is greater than a thickness of said large outside diameter tube portion.

5. The shock absorber for a vehicle according to claim 3 wherein a length of said small outside diameter tube portion is substantially equal to a length of said large outside diameter tube portion.

6. A shock absorber according to claim 1, wherein said multi-diameter stepped tube is a three-diameter stepped tube, said multi-diameter stepped tube forming a small outside diameter tube portion, a medium outside diameter tube portion and a large outside diameter tube portion which are substantially obtained by partially reducing or partially enlarging a straight tube that can be plastically deformed, each edge of different diameter tube portions connected by steps in order that axes of each different diameter tube portions located on a substantially aligned axis, said different diameter tube portions arranged in order of size of diameter, and said large outside diameter tube portion provided and fixed on the impact receiving part of the frame of the vehicle.

7. The shock absorber according to claim 6 wherein a wall thickness of each succeeding smaller diameter tube portion is larger than a wall thickness of the proceeding larger in diameter tube portion.

8. The shock absorber for a vehicle according to claim 6 wherein a width of a step between said small outside diameter tube portion and said medium outside diameter tube portion is greater than a thickness of said medium diameter tube portion and a width of a step between said medium outside diameter tube portion and said large outside diameter tube portion is greater than a thickness of said large outside diameter tube portion.

9. The shock absorber for a vehicle according to claim 6 wherein a length of said small outside diameter tube portion is greater than a length of said medium outside diameter tube portion and a length of said medium outside diameter tube portion is substantially equal to a length of said large outside diameter tube portion.

* * * * *